(12) United States Patent
Eck et al.

(10) Patent No.: US 9,975,651 B1
(45) Date of Patent: May 22, 2018

(54) TRANSFER STATION FOR TRANSFERRING CONTAINERS BETWEEN UNMANNED AERIAL VEHICLES AND UNMANNED GROUND VEHICLE

(71) Applicants: Brandon Eck, Washington, DC (US); Brett Wagner, Washington, DC (US)

(72) Inventors: Brandon Eck, Washington, DC (US); Brett Wagner, Washington, DC (US)

( * ) Notice: Subject to any disclaimer, the term of this patent is extended or adjusted under 35 U.S.C. 154(b) by 0 days. days.

(21) Appl. No.: 15/416,639

(22) Filed: Jan. 26, 2017

(51) Int. Cl.
| B65G 67/04 | (2006.01) |
| B64F 1/32 | (2006.01) |
| B64C 39/02 | (2006.01) |
| B64D 1/22 | (2006.01) |

(52) U.S. Cl.
CPC .............. B64F 1/32 (2013.01); B64C 39/024 (2013.01); B64D 1/22 (2013.01); B65G 67/04 (2013.01); *B64C 2201/128* (2013.01); *B65G 2814/0398* (2013.01)

(58) Field of Classification Search
CPC .............. B65G 67/04; B64C 2201/128; B64C 2201/20; B64C 2201/201
See application file for complete search history.

(56) References Cited

U.S. PATENT DOCUMENTS

| 9,384,668 B2 * | 7/2016 | Raptopoulos | ........ G08G 5/0069 |
| 9,387,928 B1 | 7/2016 | Gentry et al. | |
| 9,777,502 B2 * | 10/2017 | Curlander | ............... E04H 14/00 |
| 9,840,340 B2 * | 12/2017 | O'Toole; Dan | ........... B64F 1/32 |
| 2014/0254896 A1 | 9/2014 | Zhou et al. | |
| 2015/0006005 A1 | 1/2015 | Yu et al. | |
| 2015/0120094 A1 | 4/2015 | Kimchi et al. | |
| 2015/0175276 A1 * | 6/2015 | Koster | ....................... B64F 1/32 244/114 R |
| 2015/0183528 A1 * | 7/2015 | Walsh | ....................... B64F 1/32 701/3 |
| 2015/0332206 A1 | 11/2015 | Trew et al. | |
| 2016/0159496 A1 * | 6/2016 | O'Toole | .................... B64F 1/32 244/110 E |
| 2016/0207627 A1 | 7/2016 | Hoareau et al. | |
| 2016/0209839 A1 | 7/2016 | Hoareau et al. | |

(Continued)

FOREIGN PATENT DOCUMENTS

WO    WO2016/037219    *    3/2016    ............... B64D 1/02

OTHER PUBLICATIONS

Amazon Prime Air. Accessed Jan. 26, 2017, 9 pages. https://www.amazon.com/Amazon-Prime-Air/b?ie=UTF-8&node=8037720011.

(Continued)

*Primary Examiner* — Mark C Hageman
(74) *Attorney, Agent, or Firm* — Smith, Gambrell & Russell, LLP

(57) ABSTRACT

A transfer station includes a housing defining an inner space, and having a front passage for passage of a UGV and a top passage for passage of a container. One or more funnels are provided at the top passage for guiding the passage of containers therethrough, and an actuator system is provided for, selectively, engaging a container with a UAV suspension system and disengaging a container from a UAV suspension system. Also provided is a transfer system that is inclusive of the transfer station, a UAV, a UGV, and a reusable container; and methods of transferring reusable containers between UAVs and UGVs.

18 Claims, 9 Drawing Sheets

(56) References Cited

U.S. PATENT DOCUMENTS

| | | | |
|---|---|---|---|
| 2016/0257423 A1* | 9/2016 | Martin | B64F 1/00 |
| 2017/0091710 A1* | 3/2017 | Van Dyke | G06Q 10/0835 |
| 2017/0305575 A1* | 10/2017 | Bash | B64F 1/32 |
| 2017/0320572 A1* | 11/2017 | High | B64C 39/024 |
| 2017/0328391 A1* | 11/2017 | Matsuda | F16B 2/22 |

OTHER PUBLICATIONS

Flirtey. Accessed Jan. 26, 2017, 8 pages, http://flirtey.com/about/.
Starship Technologies. Accessed Jan. 26, 2017, 4 pages, ttps://www.starship.xyz/.
Dispatch Joins The Ground Delivery Club. Accessed Jan. 26, 2017, 8 pages. https://techcrunch.com/2015/11/10/dispatch-joins-the-ground-delivery-club/.
Matternet. Accessed Jan. 26, 2017 8 pages, https://mttr.net/product.
Matternet. Press Release: Matternet Partners with Mercedes-Benz to Create the Future of Delivery. Sep. 7, 2016. 3 pages. Accessed Jan. 26, 2017, https://mttr.net/images/MatternetPressKit.zip.
Horsefly: Autonomous Drone Delivery System. Accessed Jan. 26, 2017, 12 pages. http://workhorse.com/aerospace.
Google/Alphabet Project Wing. Accessed Jan. 26, 2017, 4 pages. https://x.company/wing/.
DHL Press Release: Successful Trial Integration of DHL Parcelcopter into logistics Chain. Accessed Jan. 26, 2017, 2 pages. http://www.dhl.com/en/press/releases/releases_2016/all/parcel_ecommerce/successful_trial_integration_dhl_parcelcopter_logistics_chain.html.

\* cited by examiner

FIG. 1a
FIG. 1b
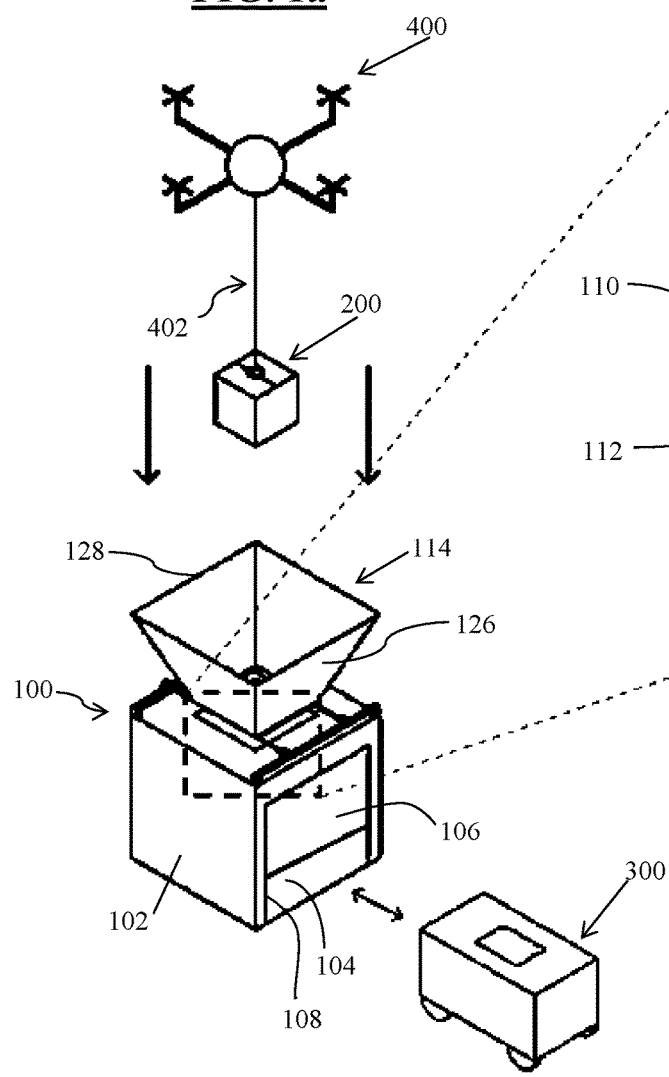
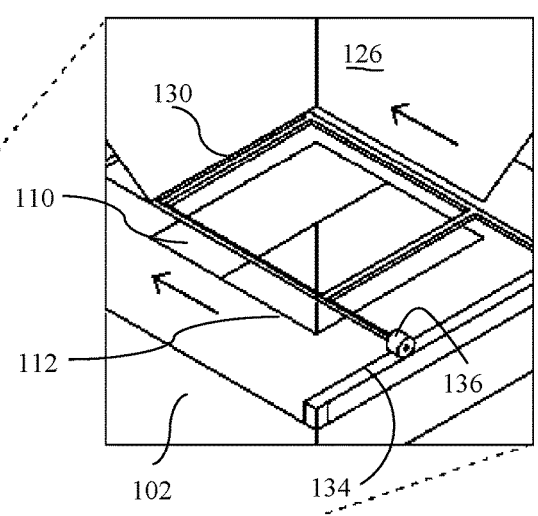

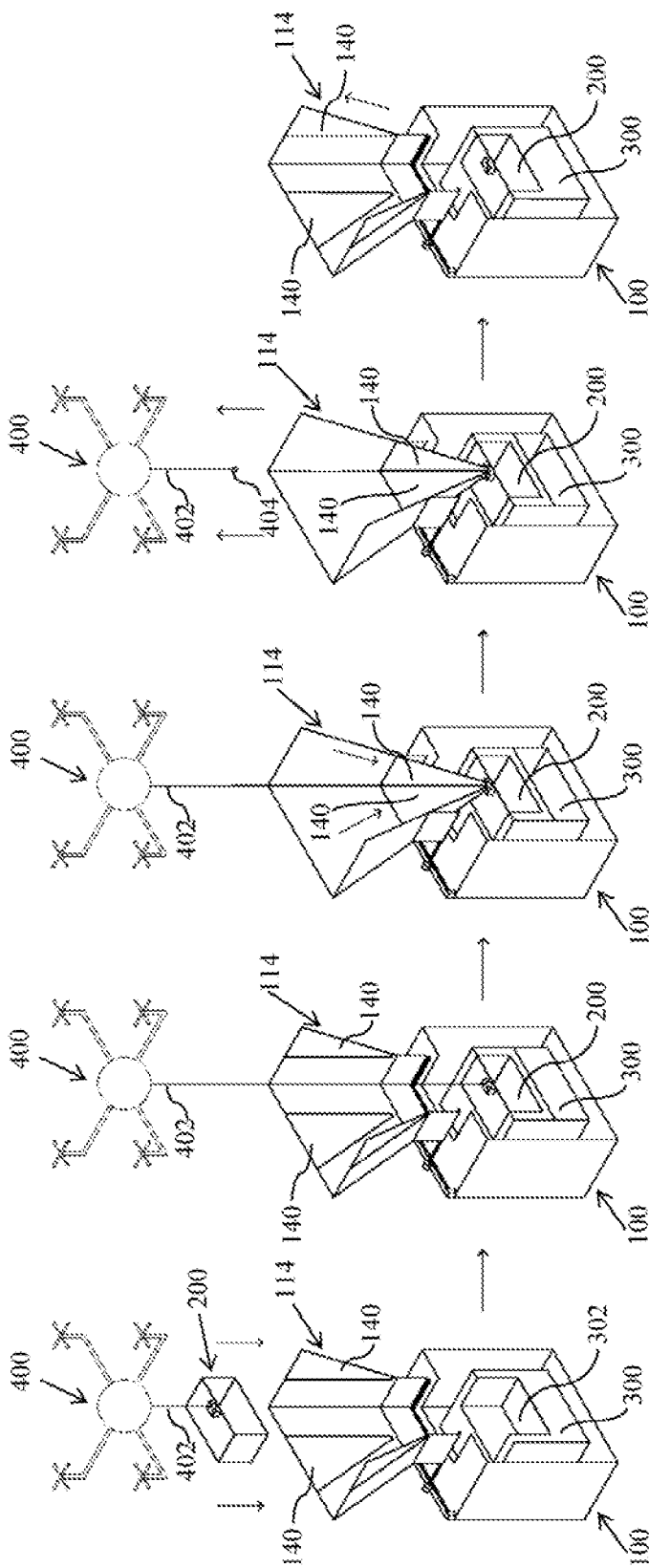

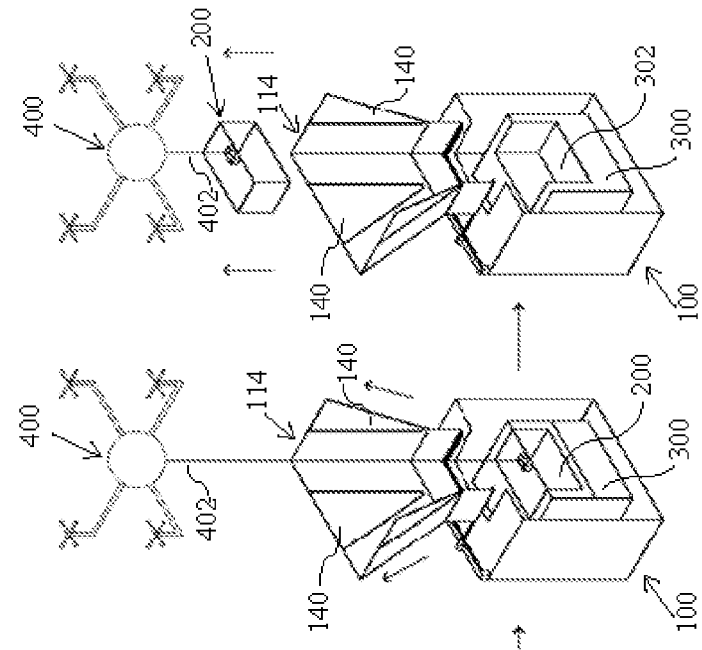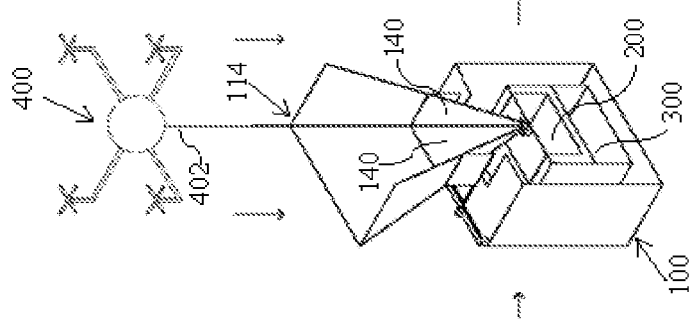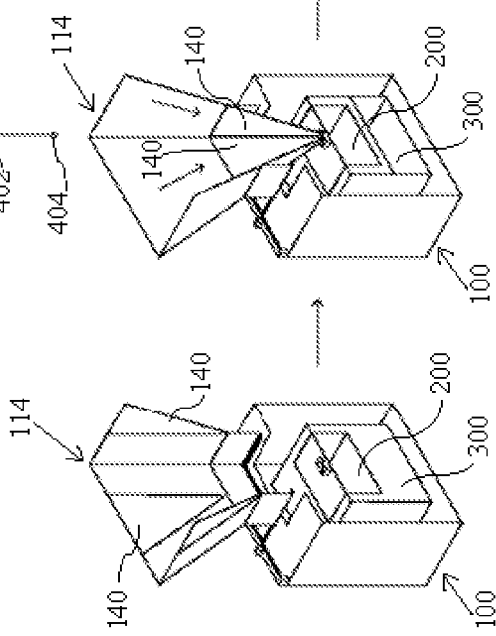

US 9,975,651 B1

TRANSFER STATION FOR TRANSFERRING CONTAINERS BETWEEN UNMANNED AERIAL VEHICLES AND UNMANNED GROUND VEHICLE

FIELD OF THE INVENTION

The present invention relates to an autonomous transfer station for transferring packages between unmanned aerial vehicles (UAVs) and unmanned ground vehicles (UGVs), delivery systems and methods using such a transfer station.

BACKGROUND OF THE INVENTION

Recent technological developments have allowed a number of industries to benefit from the low cost and efficient operations of UAVs. For example, the agriculture industry uses UAVs to survey land and monitor irrigation systems; the filming industry uses UAVs to capture camera shots that are not possible using conventional filming methods; and the architecture industry uses UAVs to create 3D images of properties for rendering structural landscapes.

An industry of particular importance that may also benefit from use of UAVs is the delivery industry. Many companies are beginning to realize the potential benefits UAVs may provide to the delivery industry, and are developing UAV-based delivery methods. One such UAV-based delivery method is a fully autonomous 'point-to-point' delivery method, where a UAV flies directly from the sender to the recipient.

However, current UAV-based point-to-point delivery methods present certain concerns in that the proximity of the UAV to bystanders, wildlife and/or physical structures along the delivery route may be undesirable due to the potential noise pollution, privacy concerns relative to drone cameras, demands associated with UAV landing space, and safety issues such as potential in-flight and landing collisions. A possible solution to these concerns is to have a UAV deliver the package to a remote delivery station. However, such use of remote delivery stations undermines the autonomous point-to-point delivery method by requiring that recipients travel to the delivery station to pick up packages, or that a separate delivery service be provided to transport packages from the remote delivery station to the recipient.

Accordingly, there remains a need in the art for a UAV-based delivery system and method that provides a fully automated point-to-point delivery of packages, while also addressing the concerns that are presented in flying a UAV directly from a sender to a recipient.

SUMMARY OF THE INVENTION

A transfer station is provided for transferring containers between an unmanned aerial vehicle (UAV) and an unmanned ground vehicle (UGV), such transfers including UAV to UGV transfers (i.e., UAV drop-off transfers) and UGV to UAV transfers (i.e., UAV pick-up transfers).

The transfer station is inclusive of a housing defining an inner space, the housing having a front passage that connects the inner space with an outer environment for the passage of a UGV, and a top passage that connects the inner space with an outer environment for passage of a container. An upward funnel is provided within the inner space of the housing, the upward funnel having a chute with a lower enlarged inlet and an upper contracted outlet, the upper contracted outlet being dimensioned to communicate with the top passage of the housing for passage of a container. A downward funnel is supported above the housing, the downward funnel having a chute with an upper enlarged inlet and a lower contracted outlet, the lower contracted outlet being dimensioned to communicate with the top passage of the housing for passage of a container. An actuator system is provided for, selectively, engaging a container with a UAV suspension system and disengaging a container from a UAV suspension system.

The downward funnel may be supported movably along a track that extends along a top of the housing; and the housing may be a modular housing that aligns and engages with at least one more substantially identical modular housing to form a multi-unit transfer station. When two or more modular housings are aligned and engaged, as a multi-unit transfer station, the tracks extending along the top of the modular housings also align and engage with one another in series, and the downward funnel is movable along the aligned and engaged tracks for selectively moving between the individual modular housings.

The actuator system is inclusive of one or more extendable and retractable slats that, when in the extended position, interact with a capture system of a container for, selectively, engaging the container with a load-bearing element of a UAV suspension system and disengaging the container from a load-bearing element of a UAV suspension system. The one or more slats interact with the capture system by, when in the extended position, opening a capture space of the capture system.

The housing further includes a front door that opens and closes the front passage, a top hatch that opens and closes the top passage, and a control system for controlling the front door and the top hatch. The control system may open the front door based on a determination that a UGV is positioned at the front passage for entering the inner space of the housing, and may open the top hatch based on a determination that a UAV is above the second passage for accessing the inner space of the housing. The control system may also condition the opening of the top hatch based on a further determination that a UGV is present in the inner space of the housing at a position that is predetermined to align a holding space of the UGV with the top passage of the housing. The control system may also include a communications system for communicating with UGVs, UAVs, other transfer stations, and/or one or more remote delivery servers.

Also provided is a transfer system that is inclusive of a transfer station; a UGV having a holding space for carrying a container; a UAV having a suspension system for carrying a container; and a container that is transferable between the UGV and the UAV. The container is dimensioned for reception within the holding space of the UGV, and the container is inclusive of a capture system for engaging the suspension system of the UAV.

The capture system of the container is inclusive of a shell defining a capture space, one or more panels that open and close the capture space, and one or more biasing elements for biasing the panels to a closed position. An actuator system of the transfer station is inclusive of one or more extendable and retractable slats that, when in the extended position, contact and move the one or more panels of the capture system of the container to an open position. The suspension system of the UAV comprises an extendable and retractable cable, and a load-bearing element at an end of the cable, the load-bearing element being dimensioned for reception within the capture space of the capture system. The actuator system controls opening and closing of the capture system for, selectively, engaging the capture system with the suspension system of the UAV via insertion of the load-bearing element into the capture space, and disengaging the capture system from the suspension system of the UAV via removal of the load-bearing element from the capture space.

A container may be transferred from a UAV to a UGV using the transfer station by positioning the UGV in the inner space of the housing of the transfer station, at a position that is predetermined to align the holding space of the UGV with the top passage of the housing. The UAV is then positioned vertically above the transfer station, at a position that aligns the suspension system of the UAV with the top passage of the housing, with the container supported on the suspension system. The UAV suspension system is then lowered to pass the container through the top passage of the housing and into the holding space of the UGV; and the slats of the actuator system are extended to move the panels of the capture system of the container to the open position. The UAV suspension system is then raised to remove the load-bearing element from the capture space of the capture system and out the top passage of the housing, after which the slats of the actuator system are retracted to permit the panels of the capture system to return to a closed position.

A container may be transferred from a UGV to a UAV using the transfer station by positioning the UGV in the inner space of the housing of the transfer station, at a position that is predetermined to align the holding space of the UGV with the top passage of the housing, with the container held in the holding space of the UGV. The UAV is then positioned vertically above the transfer station, at a position that aligns the suspension system of the UAV with the top passage of the housing. The slats of the actuator system are then extended to move the panels of the capture system of the container to the open position; and the UAV suspension system is then lowered to pass the load-bearing element through the top passage of the housing and into the capture space of the capture system of the container. The slats of the actuator system are then retracted to permit the panels of the capture system to return to a closed position, entrapping the load-bearing element within the capture space; after which the UAV suspension system is raised to lift the container from the holding space of the UGV and out the top passage of the housing.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate several embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIG. 1a shows a transfer station according to the present invention, in use with a UAV and a UGV according to the present invention;

FIG. 1b shows a close-up sectional view of the transfer station in FIG. 1a, illustrating a portion of a funnel and a top hatch of the transfer station;

FIG. 2b shows a cross-sectional elevation view of the transfer station in FIG. 2a;

FIG. 3b shows an open view of the reusable container in FIG. 3a;

FIGS. 7a-7e show a UAV drop-off of a container according to the present invention;

FIGS. 8a-8e show a UAV pick-up of a container according to the present invention.

DETAILED DESCRIPTION OF THE INVENTION

Figure 2A:
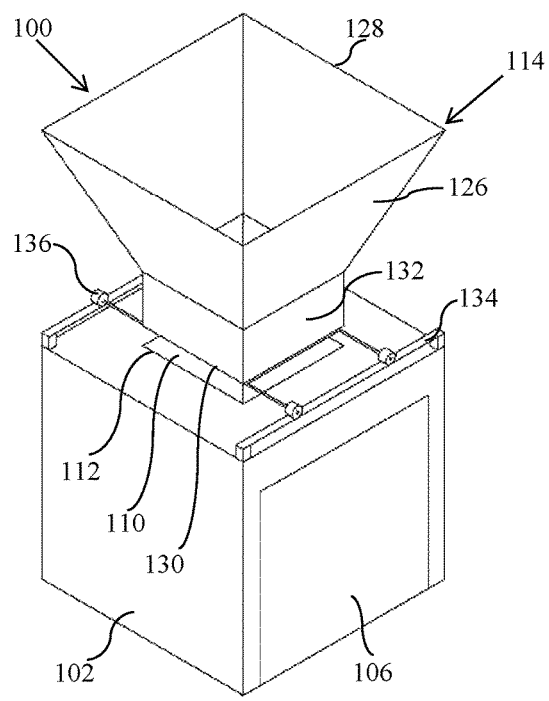
FIG. 2a shows another view of a transfer station according to the present invention.

The following disclosure discusses the present invention with reference to the examples shown in the accompanying drawings, though does not limit the invention to those examples.

The present invention is inclusive of an autonomous transfer station for transferring packages between UAVs and UGVs, as well as a reusable package-carrying container that is transferable between the UAVs and UGVs via the transfer station. The invention is further inclusive of a delivery system and method that utilizes the transfer station and reusable containers for completing fully automated point-to-point delivery of packages via one or more UAVs and one or more UGVs.

FIG. 1a shows an example of a transfer station 100 according to the present invention. The transfer station 100 includes a housing 102 that defines an inner space 104; the housing 102 having a front door 106 that opens and closes a first front passage 108 between the inner space 104 and an outer environment, and a top hatch 110 that opens and closes a second top passage 112 between the inner space 104 and an outer environment. A downwardly tapering funnel 114 is supported above the housing 102, and an upwardly tapering funnel 116 is provided within the housing 102.

The front passage 108 of the housing 102 is dimensioned for a UGV 300 to enter the inner space 104 therethrough. In some instances, the inner space 104 may be dimensioned to receive and fully enclose the UGV 300 with the front door 106 in a fully closed state. The top passage 112 of the housing 102 is dimensioned for a reusable container 200 to pass therethrough, for transfer between a UAV 400 outside the transfer station 100 and a UGV 300 parked at the inner space 104 of the transfer station 100. Preferably, the top passage 112 is dimensioned to closely correspond with the dimensions of the container 200 and is oriented to correspond with the orientation of a holding space 302 of a UGV 300 such that, when passing through the top passage 112, the container 200 is oriented to correspond with the orientation of the holding space 302 of the UGV 300.

The downwardly tapering funnel 114 above the housing 102 guides the transfer of a container 200 from a UAV 400 above the transfer station 100 to a UGV 300 within the transfer station 100; and the upwardly tapering funnel 116 within the housing 102 guides the transfer of a container 200 from a UGV 300 within the transfer station 100 to a UAV 400 outside the transfer station 100. Preferably, both the downwardly tapering funnel 114 and the upwardly tapering funnel 116 are configured to guide containers 200 that pass therethrough to align with the orientation of the top passage 112. Orientation of the container 200 within the funnels 114/116 may be achieved in any number of ways, including the use of specially shaped surfaces, magnets, hooks, mechanical arms, and combinations thereof.

In examples where the transfer station 100 is a stand-alone structure, the front passage 108 and the top passage 112 may communicate the inner space 104 with a common outer environment. In other examples, such as when the transfer station 100 is incorporated in another structure, the front passage 108 may communicate the inner space 104 with an outer environment that is different from an outer environment with which the top passage 112 communicates the inner space 104. For example, a transfer station 100 may be provided in a building, with the top passage 112 (optionally via a top hatch 110) opening to a roof of the building and the front passage 108 (optionally via a front door 106) opening to an internal space of the building.

A UGV 300 suitable for use with the transfer station 100 will include a holding space 302 dimensioned to receive a container 200. Preferably, the holding space 302 will be dimensioned to correspond with the dimensions of the container 200 and/or may include protruding structures for supporting the reusable container 200. In one example, the protruding structures may serve to hold the container inside the UGV at a specific and non-flexible location; and the protruding structures may additionally have sensors on them to notify the station of the presence or absence of the container within the UGV.

In examples where the holding space 302 is constructed with dimensions closely corresponding with the dimensions of the container 200, it is preferable there be some manner for reliably positioning the UGV 300 within the inner space 104 of the housing 102 to align the holding space 302 with the similarly dimensioned top passage 112, such that a container 200 may easily be delivered into and taken from the holding space 302 without requiring a complex maneuvering of the container 200. Reliable positioning of the UGV 300 within the housing 102 may be achieved via a guiding system 118 that directs the UGV 300 to park at a position that is predetermined to align the holding space 302 with the top passage 112. In this way, with the UGV 300 parked at the predetermined position, a container 200 may be reliably delivered to or taken from the holding space 302 of the UGV 300 via a simple raising or lowering motion through the top passage 112, without requiring any lateral correction other than that provided by one of the funnels 114/116.

A guiding system 118 may take a variety of forms provided it functions to reliably direct a UGV 300 to the predetermined position. For example, a guiding system 118 may include a contoured floor surface, such as a sloped surface having tracks that lead to preset points where the wheels of the UGV 300 will come to rest, with a stopping structure at the preset points (e.g., divots or protrusions). In another example, a guiding system 118 may include an automated conveyor, which may attach to a portion of the UGV 300 and then pull and/or push the UGV 300 to the predetermined position. A further example of a guiding system 118 may include a localized positioning system (LPS) having a network of sensors, transmitters, and/or transceivers that determine the position of the UGV 300 within the inner space 104 and communicate positioning information to a navigation system of the UGV 300 for use in autonomously navigating the UGV 300 to the predetermined position. A suitable guiding system 118 may also include a combination of two or more of the foregoing examples.

The upwardly tapering funnel 116 is provided below the top passage 112, and includes a chute 120 having a lower enlarged inlet 122 and an upper contracted outlet 124. The chute 120 is dimensioned such that the lower enlarged inlet 122 has a length and width sufficient to ensure reliable reception of a container 200 that is lifted vertically from a holding space 302 of a UGV 300 parked at the predetermined position; and such that the upper contracted outlet 124 has a length and width that corresponds with the length and width of the top passage 112 of the housing 102.

The downwardly tapering funnel 114 includes a chute 126 having an upper enlarged inlet 128 and a lower contracted outlet 130. In the example shown in FIGS. 1a-1b the chute 126 is formed in a square-shape with four sloping surfaces; though the chute 126 may be formed in any preferred shape with any number of surfaces, including a conical shape formed with a single curved surface. The chute 126 is dimensioned such that the lower contracted outlet 130 has a length and width that corresponds with the length and width of the top passage 112 of the housing 102.

In some examples, such as that shown in FIG. 1b, the lower contracted outlet 130 of the chute 126 may communicate with the top passage 112, without any intermediate structure therebetween. In other examples, such as that shown in FIGS. 2a-2b, funnel 114 may include an intermediate channel 132 that communicates the lower contracted outlet 130 of chute 126 with the top passage 112. When the transfer station 100 is a stand-alone structure, it is preferable the upper enlarged inlet 128 have a length and width that is no larger than the length and width of the housing 102. However, if the transfer station 100 is incorporated in another structure, then the top enlarged inlet 128 may have any length and/or width suitable for use with the larger structure. For example, if the transfer station 100 is provided in a building, with the top passage 112 (optionally via a top hatch 110) opening to a roof of the building, then the chute 126 may be constructed within the roof of the building and the upper enlarged inlet 128 may have a length and/or width that exceeds the length and/or width of the housing 102. The height of the funnel 114 may be varied as needed.

The funnels 114 may be constructed with alternative shapes and configurations that are specially adapted for the environment in which the transfer station 100 is to be deployed. For example, when constructing a transfer station 100 for use in an environment with snow accumulation, it may be preferable to construct the funnel 114 to mitigate snow buildup by constructing the sides of the funnel 114 with a plurality of openings sized to allow the passage of snow, or a series of downward angled surfaces that allow the passage of snow. The funnel 114 may also be constructed with deflectors or caps that deploy in inclement weather situations to inhibit the collection of snow, sleet, and/or ice within the funnel 114. As another example, when constructing a transfer station 100 for use in an environment with ice accumulation, it may be preferable to construct the funnel 114 (and optionally the housing 102) with heating coils for melting away accumulated ice. Similarly, when constructing a transfer station 100 for use in high-heat environments, it may be preferable to construct the funnel 114 (and optionally the housing 102) with fans for providing conductive cooling and/or surface treatments that reduce heat retention.

Figure 2B:
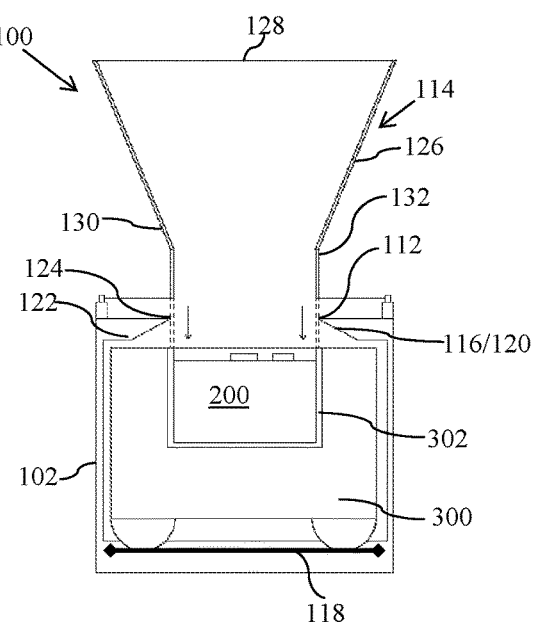
Figure 9:
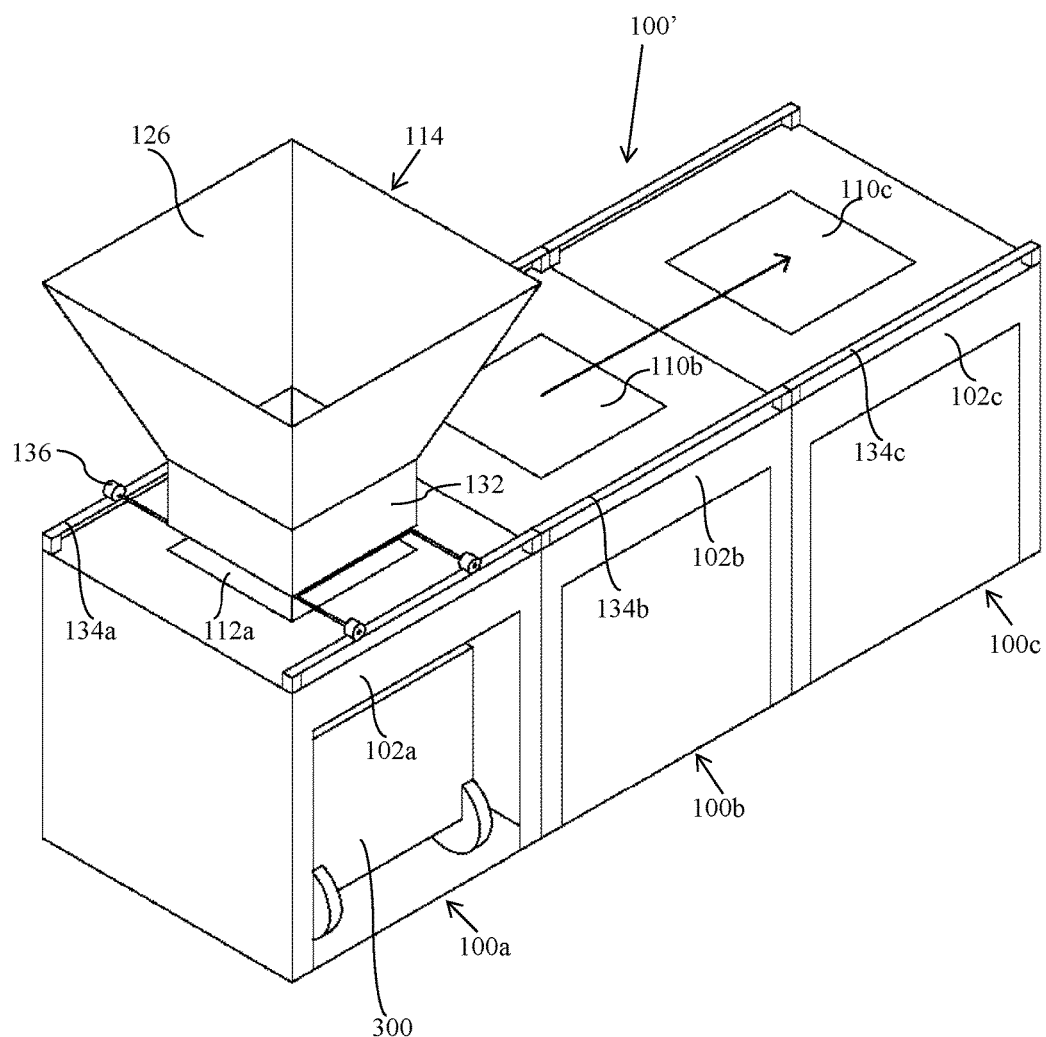
FIG. 9 shows a multi-unit transfer station formed from aligning multiple individual multiple transfer stations according to FIGS. 2a-2b.

The funnel 114 may be mounted directly to the top of the housing 102, in a fixed position; or may be supported movably above the housing 102. For example, as shown in FIGS. 1b and 2a, the funnel 114 may be supported on a track 134 and may include a movement system at the base thereof. With such a construction, individual transfer stations 100a/100b/100c may be positioned side-by-side to construct a multi-unit transfer station 100' as shown in FIG. 9, with the respective tracks 134a/134b/134c of each housing 102a/102b/102c aligned and engaged such that a single funnel 114 may move therealong to separately service each of the individual transfer stations 100a/100b/100c as needed. The track 134 may be a separate structure mounted on the housing 102, or may be constructed monolithically in the housing 102 such as a recessed canal through which a base of the funnel 114 may slide.

FIGS. 1b, 2a and 9 show one example of a movement system that includes wheels 136 mounted to the base of the funnel 114 and aligned to roll along the track 134. The wheels 136 may be motorized for rotating under the power of a funnel motor provided at the base of the funnel 114. Alternatively, the wheels 136 may be non-motorized, and a pulley system may be provided whereby one or more pulley motors at one or both sides of the housing 102 (or at one or both ends of a multi-unit transfer station 100') are joined to the funnel 114 by cables or chains, with the wheels 136 rotating under the force of the pulley motors.

When the funnel 114 is supported movably above a multi-unit transfer station 100', the funnel 114 may be constructed with slanted surfaces at its base that act as plows during the lateral movements of the funnel 114 to aid in the removal of debris that may have collected on the top surface of the transfer station 100' (e.g., built-up snow; fallen leaves; etc.). With such a construction, the transfer station 100' may be configured to periodically move the funnel 114 along the tracks 134/134b/134c for the sole purpose of removing any potentially built-up debris. A movable funnel 114 may also be made to have a telescoping intermediate channel 132 that communicates the lower contracted outlet 130 of the chute 126 with a top passage 112 of a housing 102a/102b/102c. With such a construction, when the funnel 114 is aligned with an opened top passage 112, the telescoping intermediate channel 132 may be expanded to extend through the opened top passage 112 to provide a fully shielded passage for transfer of a container 100 between the funnel 114 and the inner space 104 of the housing 102.

The transfer station 100 also includes a actuator system 138 for interacting with a capture system 210 of a container 200 that is received in the holding space 302 of a UGV 300. FIGS. 7a-7e and 8a-8e show one example of a actuator system 138 that includes a number of slats 140 positioned at the chute 126 of the funnel 114, on or within the walls of the chute 126. In this example, the slats 140 are moveable between a retracted position (as for example in FIG. 7a) and an extended position (as for example in FIG. 7c) in which the slats 140 interact with a capture system 210 of a container 200. Preferably, when in the extended position and engaged with the capture system 210 of a container 200, the slats 140 take the form of an extended funnel shape that serves to guide a load-bearing element 404 of a UAV suspension system for reception in the capture system 210 of a container 200.

Figure 3A:
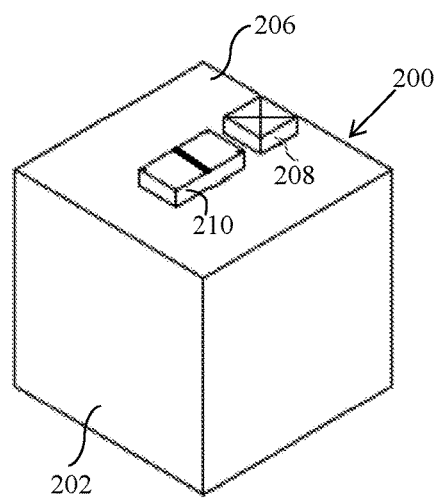
FIG. 3a shows a closed view of a closed reusable container for use with a transfer station according to the present invention.
Figure 3B:
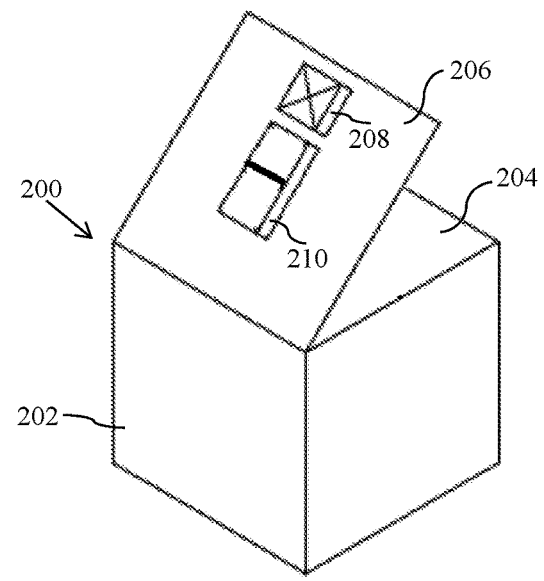

FIGS. 3a and 3b show one example of a reusable container 200 for carrying and transferring packages between UAVs 400 and UGVs 300 via the transfer station 100. The container 200 includes a shell 202 that defines an inner space 204 for receiving one or more packages for delivery to a customer; and having one or more flaps 206 for opening or closing the shell 202. Preferably, a lock 208 is provided on the shell 202 for releasably securing the flap(s) 206. A capture system 210 is provided on a top outer surface of the shell 202 for engaging with a suspension system of a UAV 400. Though in the example in FIGS. 3a and 3b the top outer surface of the shell 202 is one in the same with the flap 206, in other examples the flap 206 may be positioned on a surface separate from the top surface on which the capture system 210 is provided. The container 200 may include positioning system (GPS) tracker for use in tracking the container 200 along its delivery route, and a battery or other power source for powering the GPS tracker.

Figure 3C:
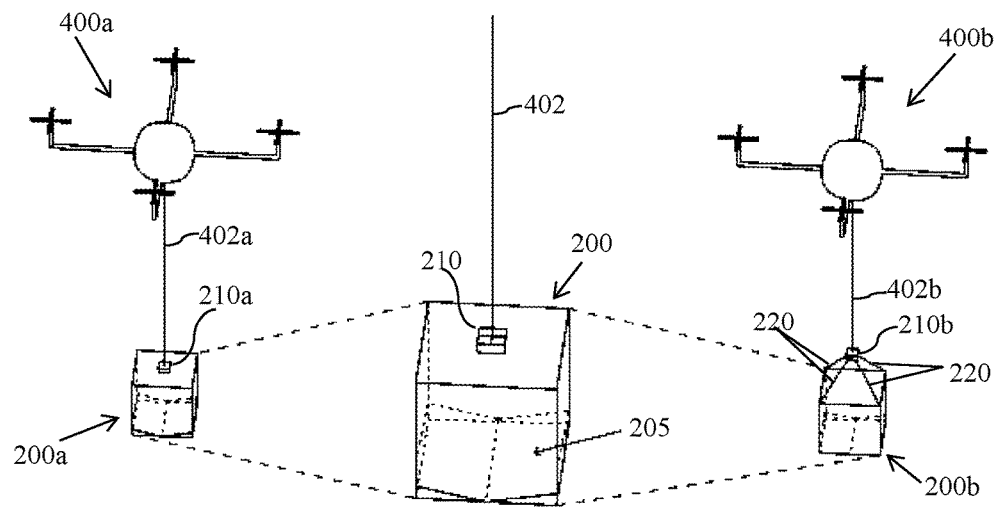
FIG. 3c shows stability enhancing constructions for a reusable container according to FIGS. 3a and 3b.

It is preferable the container 200 be configured to promote a stabilized transport thereof, so as to suppress the movement of the contents within the container 200 during vertical pickup and horizontal transport thereof. FIG. 3c illustrates two examples for achieving such a configuration. In both examples, the containers 200 (e.g., containers 200a/200b) may be constructed with an internal bottom surface 205 of the container 200 is sloped, tapered, or otherwise downwardly funneled toward a centralized location of the inner space 204 that aligns with a central axis of the container 200. In this way, there is promoted a centralized positioning of contents within the inner space 204, which is expected to both suppress movement of contents and promote a symmetrical distribution of the weight of the container 200.

Stability of the containers 200 (e.g., containers 200a/200b) may be further enhanced by centralizing the point of connection between the UAV (via a UAV cable 402) and the container 200 (via a capture mechanism 210). In one example, as shown in FIG. 3c, the point of connection between a UAV 400a and a container 200a may be centralized by positioning the capture system shell 212 at point on a top surface of the container 200a that aligns with the central axis of the container 200a. In another example, as also shown in FIG. 3c, the point of connection between a UAV 400b and a container 200b may be centralized by using a capture system 210b that includes a capture system shell 212 that is not attached to a surface of the container 200b, but which includes retractable cables 220 that extend between the capture system shell 212 and the top corners of the container shell 202. In the example shown in FIG. 3c the container 200b is square shaped with four corners and four cables 220; though it will be appreciated that the container 200b may have any number of corners with any number of corresponding cables 220. The retractable cables 220 may be biased toward a retracted state within the container 200b, in which state the tension in the cables 220 act with equal force to bias the capture system shell 212 toward a point on a top surface of the container 200b that aligns with the central axis of the container 200b. When the container 200b is supported by a UAV cable 402b, the retractable cables 220 may extend under the weight of the container 200b, with the capture system shell 212 lifting upwardly and away from the top surface of the container 200b. When extended, the retractable cables 220 equally distribute the weight of the container 200b such that the vertically displaced capture system shell 212 remains aligned with the central axis of the container 200b.

FIGS. 4a-4e and 5a-5f show one example of a capture system 210 for use with a reusable container 200, in the form of a clamping mechanism, as well methods of delivering (FIGS. 4a-4e) and picking-up (FIGS. 5a-5f) a container 200 having such a capture system 210. The capture system 210 is provided on an outer surface of a shell 202 of a container 200 and includes a casing 212 having one or more panels 214 for accessing a capture space 216 that is separate from an inner space 204 of the container 200. The panels 214 are biased to a closed position (as in FIG. 4a) by one or more biasing elements 218. In use, a container 200 may be transferred between a holding bay of the UAV 400 and a holding space 302 of a UGV 300 via a UAV suspension system that includes an extendable and retractable cable 402 having a load-bearing element 404 at an end thereof; the load-bearing element 404 being dimensioned for reception and entrapment within the capture space 216 of the capture system 210 when the panels 214 are in the closed position (as in FIG. 4a).

Non-limiting examples of biasing elements 218, for biasing the panels 214 to the closed position, may include springs, magnets, electric motors, and combinations thereof. In some examples the biasing elements 218 may be of a purely mechanical type, such that the capture system 210 may operate without an electrical energy supply. The load-bearing element 404 may be formed of metal, plastic, or any other material that keeps shape under pressure; with the body being a spherical shape or any other preferred shape (e.g., cube, rectangular prism, triangular prism, spiked sphere, etc.).

Figure 4A:
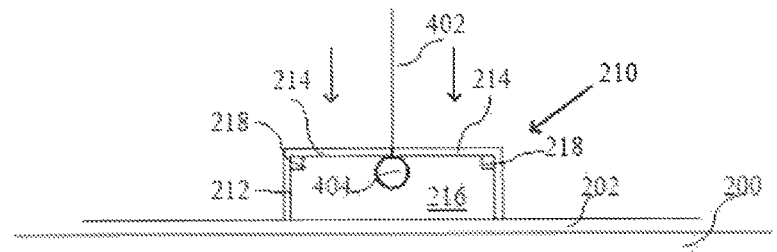
FIGS. 4a-4e show the interaction of a load-bearing element of a UAV and a capture system of a reusable container in performing a UAV drop-off of a container according to the present invention.
Figure 4B:
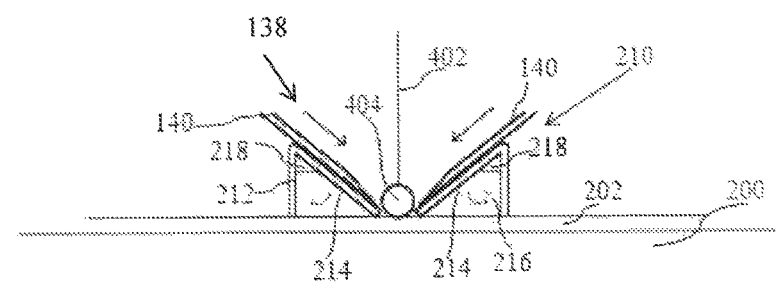
Figure 4C:
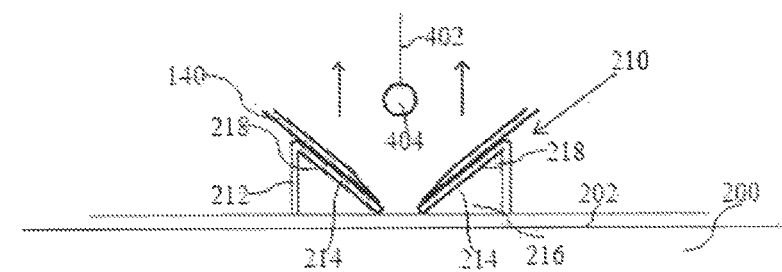
Figure 4D:
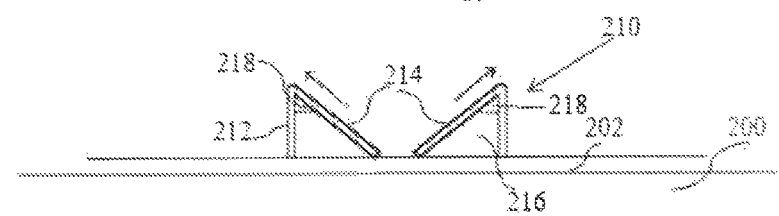
Figure 4E:
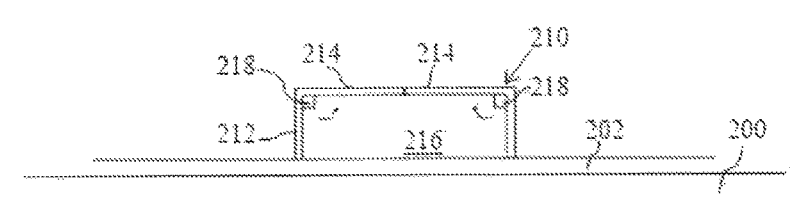

As shown in FIGS. 4a-4e, when a container 200 is being transferred from a UAV 400 to a UGV 300 via a transfer station 100 (a UAV drop-off transfer), after lowering the container 200 into the holding space 302 of the UGV 300 (as in FIG. 4a), the slats 140 of the actuator system 138 are activated to extend and press against the panels 214 of the capture system 210 with sufficient force to move the panels 214 to an open position (as in FIG. 4b). The UAV 400 then retracts the cable 402 to remove the load-bearing element 404 from the capture space 216 of the capture system 210 (as in FIG. 4c), after which the slats 140 are retracted (as in FIG. 4d) thereby allowing the biasing elements 218 to return the panels 214 to the closed position (as in FIG. 4e).

Figure 5A:
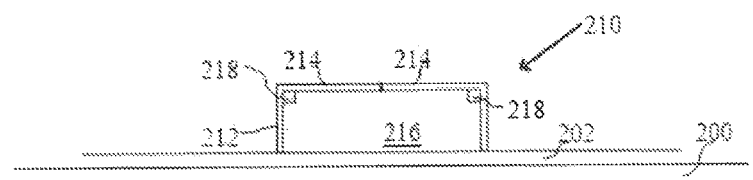
FIGS. 5a-5f show the interaction of a load-bearing element of a UAV and a capture system of a reusable container in performing a UAV pick-up of a container according to the present invention.
Figure 5B:
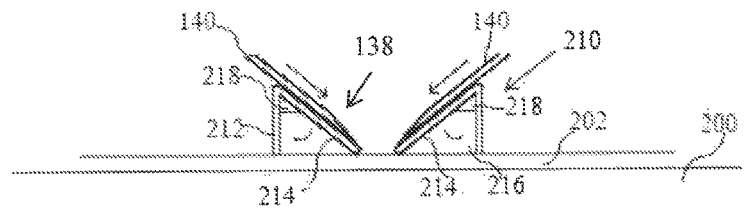
Figure 5C:
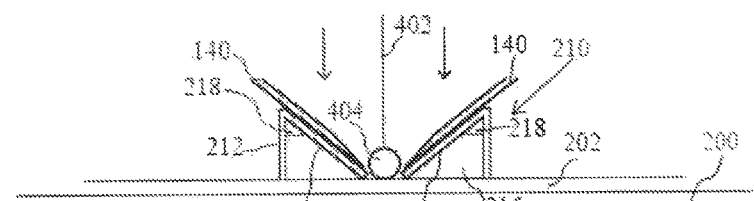
Figure 5D:
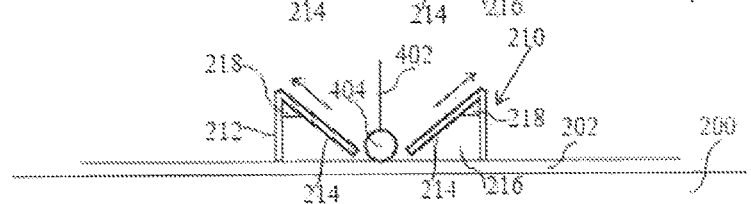
Figure 5E:
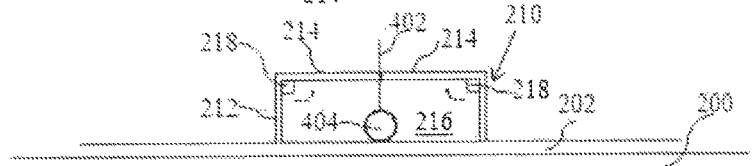
Figure 5F:
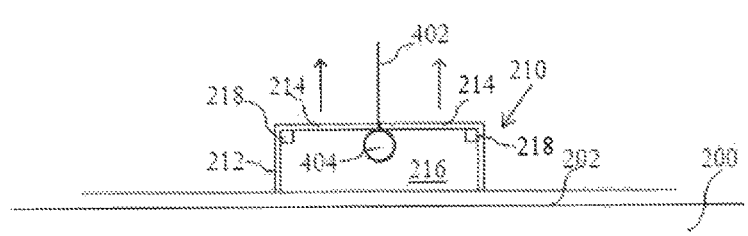

As shown in FIGS. 5a-5f, when a container 200 is being transferred from a UGV 300 to a UAV 400 via a transfer station 100 (a UAV pick-up transfer), after parking the UGV at the predetermined position to align the holding space 302 with the top passage 112 (as in FIG. 5a), the slats 140 of the actuator system 138 are activated to extend and press against the panels 214 of the capture system 210 with sufficient force to move the panels 214 to an open position (as in FIG. 5b), and the load-bearing element 404 is then lowered into the capture space 216 (as in FIG. 5c). The slats 140 are then retracted (as in FIG. 5d) thereby allowing biasing elements 218 to return the panels 214 to the closed position, entrapping the load-bearing element 404 within the capture space 216 (as in FIG. 5e). The cable 402 is then retracted causing the load-bearing element 404 to abut against the inner surface of the closed panels 214 (as in FIG. 5f), and thereby lifting the container 200 from the holding space 302 of the UGV 300 and into the holding bay of the UAV 400.

It will be appreciated that the capture system 210 is not limited to the example shown in FIGS. 4a-4e and 5a-5f; and that the capture system 210 may take any number of forms. Non-limiting example of capture systems may include a clamping mechanism such as that shown in FIGS. 4a-4e and 5a-5f; a magnetic (or electromagnetic) mechanism, a hook mechanism, a Velcro® mechanism, or combination thereof.

The container 200 may be made with any given dimensions, provided the holding space 302 of the UGV 300 and the holding bay of the UAV 400 can be constructed with corresponding dimensions for receiving the container 200, and provided the transfer station 100 may likewise be constructed with corresponding dimensions for handling the container 200.

The housing 102 may be made of any material that is weather resistant. Non-limiting examples of materials suitable for constructing the housing 102 include metal, plastic, wood, glass, fiber glass, carbon fiber, and combinations thereof. The funnels 114/116 (which may include the slats 140) may be made of any of the same materials, or combinations of materials, that are suitable for the housing 102, though with the further consideration that the funnels 114/116 must be constructed to withstand the weight and forces incurred by the sliding of a container 200 therealong. The track 134 may likewise be made of any of the same materials, or combinations of materials, that are suitable for the housing 102, though with the further consideration that the track 134 must be constructed to withstand the weight and movement of the funnel 114 therealong, as well as the additional weight and forces incurred when a reusable container 200 passes through the funnel 114.

The front door 106 and top hatch 110 may be made of any closure structure. Non-limiting examples of closure structures that may be used for the front door 106 and/or top hatch 110 include a single panel or object closure (e.g., a moving plate), a multiple panel or object closure (e.g., a series of hinged panels, or a series of plates or bars), and combinations thereof. The panel(s) and/or object(s) making up the front door 106 and top hatch 110 may be made of any material offering a suitable degree of protection and durability. In some examples, the transfer station 100 may omit a front door 106 and/or a top hatch 110, such that the front and/or top passages 108/112 are always in an open state.

Figure 6:
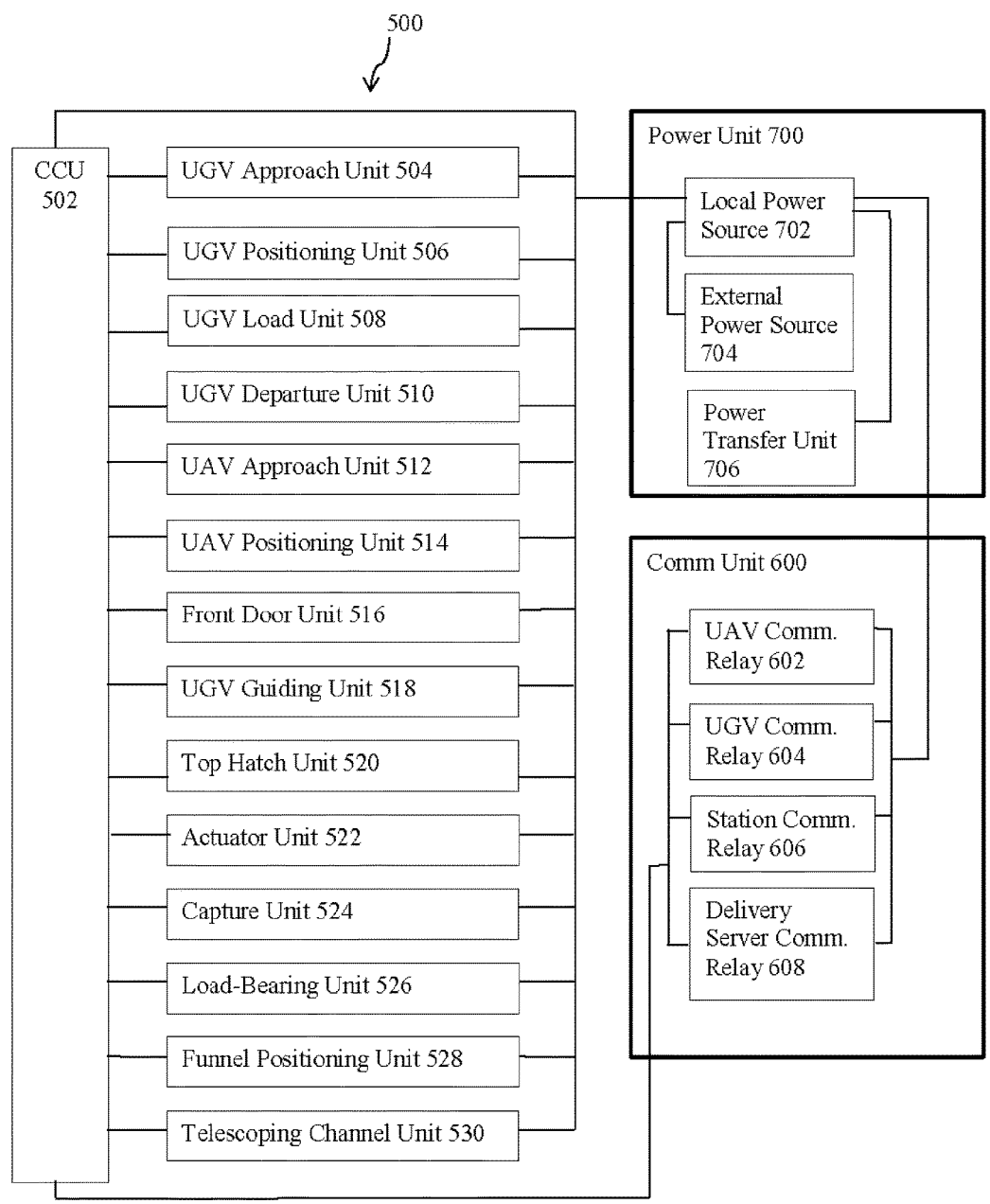
FIG. 6 shows a schematic of a control system of a transfer station according to the present invention.

FIG. 6 shows one example of a control system 500 for a transfer station 100 according to the present invention. The control system 500 includes a central control unit (CCU) 502 that interfaces with several components to effect operation of the transfer station 100.

A UGV approach unit 504 may include one or more UGV approach sensors for detecting the approach of a UGV 300 relative to the transfer station 100, and for outputting a signal to the CCU 502 indicating that a UGV 300 is approaching the transfer station 100. Non-limiting examples of suitable UGV approach sensors may include sonar, laser, RFID, and combinations thereof.

A UGV positioning unit 506 may include one or more UGV positioning sensors for determining both that a UGV 300 is within the inner space 104 of the housing 102 and whether the UGV 300 is located at the predetermined position that aligns the holding space 302 of the UGV 300 with the top passage 112 (the top hatch 110) of the housing 102, and for outputting a signal to the CCU 502 indicating positioning of the UGV 300 within the housing 102, which may include positing information indicating whether the UGV 300 is entirely entered within inner space 104, whether the UGV 300 is parked at the predetermined position, and/or the localized positioning data indicating relative positioning of the UGV 300 in relation to the predetermined position. Non-limiting examples of suitable UGV positioning sensors may include touch sensors, pressure sensors, ultra sonic sensors, infrared sensors, and combinations thereof.

A UGV load unit 508 may include one or more UGV load sensors for determining whether the holding space 302 of a UGV 300 parked in the housing 102 is loaded with a container 200, and for outputting a signal to the CCU 502 indicating load state of the UGV 300 as either empty or loaded with a container 200. Preferably, the UGV load sensors also detect changes in the load state of the UGV 300, and output signals to the CCU 502 indicating changes in the load state of the UGV 300 that are indicative that a container 200 has either been delivered to or removed from the holding space 302 of the UGV 300. Non-limiting examples of suitable UGV load sensors may include touch sensors, pressure sensors, ultra sonic sensors, infrared sensors, a weight sensor below the predetermined position, and combinations thereof. In some examples, the load state of the UGV 300 may be assessed by a sensor on the UGV 300 itself, and the load state of the UGV 300 may be communicated to the transfer station 100 via the transmission of signals between a communication system of the UGV 300 and a UGV communications relay of the transfer station 100.

A UGV departure unit 510 may include one or more UGV departure sensors for detecting the departure of a UGV 300 from transfer station 100, and for outputting a signal to the CCU 502 indicating that a UGV 300 has departed the transfer station 100. Non-limiting examples of suitable UGV departure sensors may include touch sensors, pressure sensors, ultra sonic sensors, infrared sensors, a weight sensor below the predetermined position, and combinations thereof.

A UAV approach unit 512 may include one or more UAV approach sensors for detecting the approach of a UAV 400 relative to the transfer station 100, and for outputting a signal to the CCU 502 indicating that a UAV 400 is approaching the transfer station 100. Non-limiting examples of suitable UAV approach sensors may include sonar, laser, RFID, and combinations thereof.

A UAV positioning unit 514 may include one or more UAV positioning sensors for determining whether a UAV 400 is at a sufficient vertical position above the transfer station 100 for aligning a holding bay of the UAV 400 with the upper enlarged inlet 128 of the funnel 114, and for outputting a signal to the CCU 502 indicating positioning of the UAV 400, which may include positing information indicating whether the UAV 400 is sufficiently positioned to align the holding bay of the UAV 400 with the upper enlarged inlet 128 of the funnel 114, and/or localized positioning data indicating relative positioning of the holding bay of the UAV 400 in relation to the upper enlarged inlet 128 of the funnel 114. Non-limiting examples of suitable UAV positioning sensors may include image sensors, light sensors, infrared sensors, distance sensors, and combinations thereof. In one example, image sensors may continuously relay positioning information between a transfer station 100 and a UAV 300 indicating any correction needed for aligning a container 200 with the funnel 114 and/or the top passage 112. Such an image sensor may recognize key orientation points on the container 200, which information may then be used to instruct the UAV 300 to rotate as needed to achieve alignment of the container 200 with the funnel 114 and/or the top passage 112. In some examples, light, infrared, and/or distance sensors may be used to monitor vertical distance between the container 200 and the transfer station 100; and such information may be used to transmit instructions for correcting the altitude of the UAV 300 and/or the container 200.

A front door unit 516 may include one or more front door motors that receive signals from the CCU 502 for the opening and closing of the front door 106. The front door unit 516 may also include one or more front door sensors that detect positioning of the front door 106 (e.g., opened, closed, or intermediate positions thereof), and/or which may detect the presence of an obstruction in the movement path of the front door 106 (e.g., a UGV, a bystander, wildlife, etc.); and which output signals to the CCU 502 indicating the positioning of the front door 106 and/or an obstruction state of the movement path of the front door 106 (e.g., obstructed, not obstructed). Non-limiting examples of suitable front door sensors may include touch sensors, pressure sensors, ultra sonic sensors, infrared sensors, and combinations thereof.

In examples where the transfer station 100 includes a UGV guiding system 118 in the form of an automated conveyor, the control system 502 may include a UGV guiding unit 518 that includes one or more guiding motors for engaging a UGV 300 and for driving the automated conveyor to move an engaged UGV 300, and which receive signals from the CCU 502 instructing engagement of a UGV 300 and/or movement of an engaged UGV 300 via the automated conveyor; and may further include one or more guiding sensors for detecting the presence of a UGV 300 within proximity for engagement by the guiding system 118, and for outputting signals to the CCU 502 indicating a UGV 300 is in proximity for engagement by the guiding system 118. Non-limiting examples of suitable guiding sensors may include touch sensors, pressure sensors, ultra sonic sensors, infrared sensors, and combinations thereof.

A top hatch unit 520 may include one or more top hatch motors that receive signals from the CCU 502 instructing opening and closing of the top hatch 110. The top hatch unit 520 may also include one or more top hatch sensors that detect positioning of the top hatch 110 (e.g., opened, closed, or intermediate positions thereof), and/or which may detect the presence of an obstruction in the movement path of the top hatch 110 (e.g., a UAV suspension system, a container, an actuator mechanism, etc.); and which output signals to the CCU 502 indicating the positioning of the top hatch 110 and/or an obstruction state of the movement path of the top hatch 110 (e.g., obstructed, not obstructed). Non-limiting examples of suitable top hatch sensors may include touch sensors, pressure sensors, ultra sonic sensors, infrared sensors, and combinations thereof.

A actuator unit 522 may include one or more actuator motors that receive signals from the CCU 502 instructing extension and retraction of the slats 140. The actuator unit 522 may also include one or more actuator sensors that detect positioning of the slats 140 (e.g., extended, retracted, or intermediate positions thereof), and/or which may detect the presence of an obstruction in the movement path of the slats 140 (e.g., a UAV suspension system, a container, accumulated snow, etc.); and which output signals to the CCU 502 indicating the positioning of the slats 140 and/or an obstruction state of the movement path of the slats 140 (e.g., obstructed, not obstructed). Non-limiting examples of suitable actuator sensors may include touch sensors, pressure sensors, ultra sonic sensors, infrared sensors, and combinations thereof.

A capture unit 524 may include one or more capture sensors that determine whether the slats 140 of the actuator system 138 have engaged the capture system 138 of the container 200; and which output signals to the CCU 502 indicating whether the slats 140 have engaged the capture system 138 of the container 200. Non-limiting examples of suitable capture sensors may include touch sensors, pressure sensors, ultra sonic sensors, infrared sensors, contact sensors at the engaging ends of the slats, force-feedback sensors at the base ends of the slats, and combinations thereof.

A load-bearing unit 526 may include one or more load-bearing sensors that detect the presence of a UAV load-bearing element 404 within the capture space 216 of the capture system 210 of a container 200; and which output signals to the CCU 502 indicating the presence or absence of a load-bearing element 404 within the capture space 216. Non-limiting examples of suitable load-bearing sensors may include light sensors or infrared sensors on the slats detecting the passing of the load-bearing element 404 within the capture space, proximity sensors at the engaging ends of the slats 140, an RFID sensor at the engaging ends of the slats 140 for communicating with an RFID tag in the load-bearing element 404, and combinations thereof.

In examples where the funnel 114 is mounted movably on a track 134, such as when the transfer station 100 is part of a multi-unit transfer station 100' (as in FIG. 9), the control system 500 may include a funnel position unit 528. A funnel position unit 528 may include one or more funnel position motors that receive signals from the CCU 502 instructing movement of the funnel 114 along the track 134 at the top of the housing 102. The funnel position unit 528 may also include one or more funnel position sensors that detect positioning of the funnel 114, including whether the funnel 114 is positioned to align the lower contracted outlet 130 with the top passage 112 (top hatch 110) of the housing 102, and/or which may detect the presence of an obstruction in the movement path of the funnel 114 along the track 134 (e.g., accumulated snow, etc.); and which output signals to the CCU 502 indicating the positioning of the funnel 114 and/or an obstruction state of the movement path of the slats 140 (e.g., obstructed, not obstructed). Non-limiting examples of suitable funnel position sensors may include touch sensors, light sensors, pressure sensors, ultra sonic sensors, infrared sensors, and combinations thereof.

In examples where the funnel 114 includes a telescoping intermediate channel 132, the control system 500 may include a telescoping channel unit 530. A telescoping channel unit 530 may include one or more telescoping channel motors that receive signals from the CCU 502 instructing extension and retraction of the telescoping channel 132. The telescoping channel unit 530 may also include one or more telescoping channel sensors that detect positioning of the telescoping channel 132 (e.g., fully extended, fully retracted, and/or intermediate positions thereof), and/or which may detect the presence of an obstruction in the movement path of the telescoping channel 132 (e.g., a closed top hatch, etc.); and which output signals to the CCU 502 indicating the positioning of the telescoping channel 132 and/or an obstruction state of the movement path of the telescoping channel 132 (e.g., obstructed, not obstructed). Non-limiting examples of suitable telescoping channel sensors may include touch sensors, distance sensors, pressure sensors, ultra sonic sensors, infrared sensors, and combinations thereof.

A communications unit 600 may include a UGV communications relay 602 that establishes communications between the CCU 502 and UGVs 300 in proximity of the transfer station 100; a UAV communications relay 604 that establishes communications between the CCU 502 and UAVs 400 in proximity of the transfer station 100; a station communications relay 606 that establishes communications between the CCU 502 and other nearby transfer stations 100b/100c; and/or a delivery server communications relay that establishes communications between the CCU 502 and a delivery server.

A UGV communications relay 602 may transmit data between the CCU 502 and one or more nearby UGVs 300 conveying load states of the UGVs 300 (e.g., available to receive a container 200, and/or available to give a container 200); delivery statuses of the UGVs 300 (e.g., seeking a UAV drop-off transfer or a UAV pick-up transfer); and/or positional data informing the relative positions of the UGVs 300 (e.g., as being within the inner space 104; as being parked at the predetermined position within the inner space 104; and/or localized positioning data indicating relative positioning of the UGV 300 in relation to the predetermined position).

A UAV communications relay 604 may transmit data between the CCU 502 and one or more nearby UAVs 400 conveying load states of the UAVs 300 (e.g., available to receive a container 200, and/or available to give a container 200); delivery statuses of the UAVs 400 (e.g., seeking a UAV drop-off transfer or a UAV pick-up transfer); and/or positional data informing the relative positions of the UAVs 400 (e.g., as being sufficiently positioned to align the holding bay of the UAV 400 with the upper enlarged inlet 128 of the funnel 114; and/or localized positioning data indicating relative positioning of the holding bay of the UAV 400 in relation to the upper enlarged inlet 128 of the funnel 114).

A station communications relay 606 may transmit data between the CCU 502 and one or more nearby transfer stations 100b/100c for conveying a status of the transfer stations (e.g., whether a UGV 300 is housed therein; a load state of a UGV 300 housed therein; etc.). In examples where the transfer station 100 is one unit 100a in a multi-unit transfer station 100', the station communications relay 606 may transmit data between the CCU 502 and the central control units of the one or more transfer stations 100b/100c for coordinating movement of a shared funnel 114 along the aligned tracks 134a/134b/134c.

In some examples the transfer station 100 may be part of a larger delivery network in which one or more delivery servers may oversee the delivery operations within a given geographical region by, for example, managing the driving routes of UGVs 300, the flight routes of UAVs 400, and the loading and transferring schedules of transfer stations 100 within a given region. In such an example, a delivery server communications relay 608 may transmit data between the CCU 502 and one or more delivery servers to update the status of the transfer station 100 with the one or more delivery servers (e.g., whether a UGV 300 is housed therein; the load state of a UGV 300 housed therein; whether a replacement container 200 is needed for delivery to a UGV 300 housed therein).

A power supply unit 700 for powering the control system 500 may include a local power source 702 (e.g., a replaceable and/or rechargeable battery; a fuel-based power source; etc.) that powers the CCU 502 as well as any other components of the control system 500 that require electrical power to operate. Optionally, the power supply unit 700 may communicate with one or more external power sources 704 for charging the local power source 702. Non-limiting examples of external power sources 704 may include solar panels, wind turbines, hydro turbines, kinetic energy transducers (e.g., for vibration energy conversion), electrical energy grids, fossil-fuel power sources, and combinations thereof. The transfer station may be constructed in any suitable place for making use of the chosen power source—e.g., at an area of unobstructed sunlight for extracting solar energy; at an area of prominent wind flow for extracting wind energy from wind turbines; near a waterway to extract hydro energy from hydroelectric turbines; etc.

A power transfer unit 706 may be provided for establishing an electrical communication for transferring electrical energy between the power supply unit 700 and an on-board power source of a UGV 300 such that the local power source 702 may charge the on-board power source of the UGV 300. In some examples, the power transfer unit 706 may permit the UGV 300 to recharge the local power source 702 as a back-up redundancy to one or more external power sources 704 that serve as the primary power delivery of electrical power for the local power source 702. Preferably, the power transfer unit 706 takes the form of a pair of mating electrical connections, with one connection provided at the transfer station 100 and the other mating connection provided on UGVs 300. Non-limiting examples of mating electrical connections that may be included in the power transfer unit 706 include one or more mating electrical sockets and plugs, one or more mating electrical plates and slip brushes, one or more mating electrical power lines and slip surfaces, and combinations thereof.

In some examples the power transfer unit 706 may be exposed for engagement by a UGV 300 without any advance electrical power requirement by the transfer station, and the power source of the UGV 300 (upon engaging the power transfer unit 706) may then serve as the sole power source for operation of the transfer station 100, without requiring a local power source 702 within the housing 102. For example, the transfer station 100 may be constructed without any front door 106, such that a UGV 300 may navigate into the inner space 104 and engage the power transfer unit 706. In another example, the power transfer unit 706 may take the form of a power receiving structure that extends between a point outside of the transfer station 100, ahead of the front door 106, to a point in the inner space 104 of the transfer station housing 102 (e.g., an overhead electrical wire; an underside electrical rail or plate; etc.), and the UGV 300 may have a power conveying structure (e.g., an overhead electrical bar or surface; a underside electrical slip brush; etc.) that engages the power receiving structure at a location external of the power transfer station 100, such that the UGV 300 may engage the power transfer unit 706 to deliver operational power upon approaching the transfer station 100.

The local power source 702 (or a UGV power source engaged with a power transfer unit 706) may deliver electrical power to the CCU 502, and the several further components of the control system 500, via one or more electrical lines. In examples where the transfer station 100 includes a moveable funnel 114 mounted on a track 134 atop the housing 102, such as when the transfer station 100 is part of a multi-unit transfer station 100', the track 134 may be constructed to transfer electrical power to any components located on the movable funnel 114 (e.g., funnel motors, sensors, and/or receivers; actuator motors, sensors and/or receivers; etc.) via an electrical connection between the track 134 and the movable funnel 114. For example, the track 134 may include an electrical rail and the movable funnel 114 may include one or more electrical slip brushes that establish an electrical connection with the electrical rail.

It will be appreciated that the control system 500 shown in FIG. 6 is one example of a control system 500 that may be used with the present invention, and that a suitable control system 500 for use with the invention may have a number of variations.

In some control systems 500, multiple individual units may be replaced by a single unit that performs all the functions of the single unit. For example, there may be provided a single UGV coordination unit that is capable of precisely monitoring the location and positioning of a UGV 300 so as to perform the functions of each of the UGV approach unit 504, the UGV positioning unit 506, and the UGV departure unit 510. Similarly, there may be provided a single UAV coordination unit that is capable of precisely monitoring the location and positioning of a UAV 400 so as to perform the functions of each of the UAV approach unit 512 and the UAV positioning unit 514.

In some control systems 500, a single communications relay may be capable of transmitting sufficiently detailed data from an outside source (e.g., a delivery server; a global positioning system; etc.) such that the data provided by the single communication relay permits the omission of one or more units. For example, if the UGV communications relay 602 is capable of transmitting sufficiently detailed positioning information and/or load information from an internal system of a UGV 300 itself then a control system 500 may omit the UGV approach unit 504, the UGV positioning unit 506, the UGV load unit 508, and the UGV departure unit 510. Similarly, if the UAV communications relay 604 is capable of transmitting sufficiently detailed positioning information and/or load information from an internal system of a UAV 400 itself then a control system 500 may omit the UAV approach unit 512 and the UAV positioning unit 514.

In operation, a transfer station 100 according to the present invention may be used to transfer reusable containers 200 from UAVs 400 to UGVs 300 (UAV drop-off transfers), and to transfer reusable containers 200 from UGVs 300 to UAVs 400 (UAV pick-up transfers). Such transfers may be managed by one or more delivery servers.

Upon determining that a given transfer station 100 is empty, a delivery server will output a signal instructing a UGV 300 to travel to and enter the transfer station 100. Upon detecting the UGV 300 within a predetermined proximity of the transfer station 100, the UGV approach unit 504 outputs a signal to the CCU 502, and the CCU 502 then outputs a signal instructing the front door unit 516 to open the front door 106. Once the UGV positioning unit 506 determines the UGV 300 has fully entered the inner space 104 of the transfer station housing 102, and outputs a signal to the CCU 502 indicating the same, the CCU 502 then outputs a signal instructing the front door unit 516 to close the front door 106.

When entering the inner space 104, the guiding system 118 will guide the UGV 300 to the predetermined position for aligning the holding space 302 of the UGV 300 with the top passage 112 (the top hatch 110) of the housing 102. In examples where the transfer station 100 includes an automated guiding system 118 (e.g., an automated conveyor), a guiding unit 518 may output a signal to the CCU 502 when there is detected the presence of the UGV 300 within proximity for engagement by the guiding system 118; and the CCU 502 may then output signals to the guiding unit 518 instructing the engagement of the UGV 300 and driving of the UGV to the predetermined position. Once the UGV positioning unit 506 determines the UGV 300 is at the predetermined position, the UGV positioning unit 506 will output a signal to the CCU 502 confirming the same.

The UGV load unit 508 determines the load state of the UGV 300, and outputs a signal to the CCU 502 indicating whether a reusable container 200 is present in the holding space 302 of the UGV 300. The CCU 502 then outputs a signal to the communications unit 600 instructing the delivery server communications relay 608 to contact one or more delivery servers to update the status of the transfer station 100 as housing a UGV 300, and further indicating the load state of the UGV 300.

When a delivery server determines that a transfer station 100 is housing a UGV 300 that is available to receive a reusable container 200, the delivery server outputs a signal instructing a container-carrying UAV 400 to travel to the transfer station 100 to transfer the container 200 to the UGV 300 (i.e., perform a UAV drop-off transfer). FIGS. 4a-4e and 7a-7e show one example of the operations that may be performed in a UAV drop-off transfer.

Upon detecting the UAV 400 within a predetermined proximity of the transfer station 100, the UAV approach unit 512 outputs a signal to the CCU 502 indicating approach of the UAV 400. If the transfer station 100 is provided as one unit within a multi-unit transport station 100', then following reception of the signal indicating approach of a UAV 400, the CCU 502 will output a signal to the funnel positioning unit 528 instructing the funnel 114 to move along the tracks 134a/134b/134c of the multi-unit transfer station 100' to align with the top hatch 110a of the individual transfer station 100a in which the container-carrying UGV 300 is parked. Depending on the movement system employed by the funnel positioning unit 528, the CCU 502 may also communicate with the other transfer stations 100b/100c in the multi-unit transfer station 100', via the station communications relay 606, to coordinate movement of the funnel 114. Once the funnel 114 is aligned with the top hatch 110a, the funnel positioning unit 528 will output a signal to the CCU 502 confirming funnel alignment.

Upon arriving vertically above the transfer station 100, the UAV 400 may output a signal to the CCU 502, via the UAV communications relay 602, indicating the UAV 400 is above the transfer station 100. At this time, a UAV positioning unit 514 may determine whether the UAV 400 is positioned at an appropriate vertical position above the transfer station 100 to align a holding bay of the UAV 400 with the upper enlarged inlet 128 of the funnel 114, and output a signal to the CCU 502 indicating whether the UAV 400 is positioned in such vertical alignment with the funnel 114. If it is determined that the UAV 400 is not positioned to so vertically align with the funnel 114, then the CCU 502 may coordinate with the UAV 400 via the UAV communications relay 602 to assist the UAV 400 in navigating to a proper position for such alignment while the UAV positioning unit 514 continues to monitor the positioning of the UAV 400 and updating the CCU 502 as to whether the UAV 400 is positioned to so align with the funnel 114.

Upon confirming the UAV 400 is positioned to align a holding bay of the UAV 400 with the upper enlarged inlet 128 of the funnel 114, the CCU 502 then outputs a signal to the top hatch unit 520 instructing opening of the top hatch 110. In some examples the UGV 300 may include a holding hatch that encloses the holding space 302; and in such instances the CCU 502, upon instructing the opening of the top hatch 110 of the housing 102, will also instruct the UGV communications relay 604 to output a signal to the UGV 300 to open the holding hatch to expose the holding space 302. In examples where the funnel 114 includes a telescoping intermediate channel 132, the CCU 502 also outputs a signal to the telescoping channel unit 530 instructing extension of the telescoping channel 132 through the opened top passage 112.

The CCU 502 then instructs the UAV communications relay 602 to output a signal to the UAV 400 indicating that the top hatch 110 is open (as in FIG. 7a). The UAV 400 then activates a suspension system to lower the cable 402 supporting a reusable container 200 (as in FIG. 7b); the container 200 being supported on the cable 402 by entrapment of a load-bearing element 404 at the end of the cable 402 within a capture system 210 of the container 200 (as in FIG. 4a). As the cable 402 is lowered, the container 200 enters into the downwardly tapered funnel 114 through the upper enlarged inlet 128 and is guided through the chute 126 and out the lower contacted outlet 130, such that the container 200 is aligned both for entry through the opened top passage 112 of the housing 102 and reception within the holding space 302 of the UGV 300 parked in the transfer station 100 (as in FIG. 7b).

Upon determining that there has been a change in the load state of the UGV 300, the UGV load unit 508 outputs a signal to the CCU 502 indicating that the container 200 has been received within the holding space 302 of the UGV 300. The CCU 502 then outputs a signal to the actuator unit 522 instructing extension of the slats 140 of the actuator system 138 to open the capture system 210 of the container 200 (as in FIG. 7c). Once the capture unit 524 determines the slats 140 have properly engaged with the capture system 210, the capture unit 524 then outputs a signal to the CCU 502 indicating that the capture system 210 is in an open state (as in FIG. 4b). The CCU 502 then outputs a signal directing the UAV communications relay 602 to instruct the UAV 400 to retract the cable 402 (as in FIG. 7d), thereby removing the load-bearing element 404 from the capture system 210 of the container 200 (as in FIG. 4c). Upon determining the load-bearing element 404 has been removed from the capture space 216, the load-bearing unit 526 outputs a signal to the CCU 502 indicting the same, and the CCU 502 then outputs a signal instructing the actuator unit 522 to retract the slats 140 (as in FIGS. 7e and 4d), thereby allowing the capture system 210 of the container 200 to return to a closed position (as in FIG. 4e).

In examples where the funnel 114 includes a telescoping intermediate channel 132, the CCU 502 next outputs a signal to the telescoping channel unit 530 instructing retraction of the telescoping channel 132 from the opened top passage 112. The CCU 502 then outputs a signal instructing the top hatch unit 520 to close the top hatch 110. The CCU 502 may then output a signal directing the delivery server communications relay 608 to contact one or more delivery servers to update the load state of both the UGV 300 parked in the transfer station 100 and the UAV 400.

When a delivery server determines a transfer station 100 is housing a container-carrying UGV 300, the delivery server outputs a signal instructing a UAV 400 that is available to receive a container 200 to travel to the transfer station 100 to pick-up the reusable container 200 (i.e., perform a UAV pick-up transfer). FIGS. 5a-5f and 8a-8e show one example of the operations that may be performed in a UAV pick-off transfer.

Detection of the approaching UAV 400, optional movement of a funnel 114 in a multi-unit transfer station 100', and confirmation of alignment between a holding bay of the UAV 400 and the funnel 114 of the transfer station proceed in the same manner here as during a UAV drop-off transfer; and so a discussion is not repeated here.

Upon confirming the UAV 400 is positioned to align a holding bay of the UAV 400 with the upper enlarged inlet 128 of the funnel 114, the CCU 502 then outputs a signal to the top hatch unit 520 instructing opening of the top hatch 110 (as in FIG. 8a). In examples where the UGV 300 includes a holding hatch enclosing the holding space 302, the CCU 502 will also instructs the UGV communications relay 604 to output a signal to the UGV 300 to open the holding hatch to expose the holding space 302. In examples where the funnel 114 includes a telescoping intermediate channel 132, the CCU 502 also outputs a signal to the telescoping channel unit 530 instructing extension of the telescoping channel 132 through the opened top passage 112.

The CCU 502 then outputs a signal to the actuator unit 522 instructing extension of the slats 140 of the actuator system 138 to engage and open the capture system 210 of the container 200 (as in FIG. 8b). Once the capture unit 524 determines the slats 140 have properly engaged with the capture system 210, the capture unit 524 then outputs a signal to the CCU 502 indicating the capture system 210 is in an open state (as in FIG. 5b). The CCU 502 then outputs a signal directing the UAV communications relay 602 to instruct the UAV 400 that the container 200 is available for pick-up.

Upon receiving a signal indicating the container 200 is available for pick-up, the UAV 400 activates the suspension system to lower the cable 402 having the load-bearing element 404 into the downwardly tapered funnel 114 (as in FIG. 8c). The funnel 114, together with the extended funnel shape formed form the extended slats 140, guides the load-bearing element 404 into the capture space 216 of the capture system 210 on the container 200 (as in FIG. 5c). Upon determining that the load-bearing element 404 has been received in the capture space 216, the load-bearing element 526 outputs a signal to the CCU 502 confirming the same, and the CCU 502 outputs a signal instructing the actuator unit 522 to retract the slats 140 (as in FIGS. 8d and 5d), thereby allowing the capture system 210 of to return to a closed position with the load-bearing element 404 entrapped therein (as in FIG. 5e).

Once the slats 140 are fully retracted, the actuator unit 522 outputs a signal to the CCU 502 confirming the same, and the CCU 502 then outputs a signal directing the UAV communications relay 602 to instruct the UAV 400 that the container 200 is ready for removal. The UAV 400 then retracts the cable 402 thereby raising the container 200 that is supported thereon by entrapment of the load-bearing element 404 within the capture system 210. As the cable 402 is raised, the container 200 enters into the upwardly tapered funnel 116 through the lower enlarged inlet 122 and is guided through the chute 120 and out the upper contacted outlet 124, such that the container 200 is aligned both for exiting the housing 102 through the opened top passage 112 (as in FIG. 8e). Upon determining there has been a change in the load state of the UGV 300, the UGV load unit 508 outputs a signal to the CCU 502 indicating the container 200 has been removed from the holding space 302 of the UGV 300.

In examples where the funnel 114 includes a telescoping intermediate channel 132, the CCU 502 next outputs a signal to the telescoping channel unit 530 instructing retraction of the telescoping channel 132 from the opened top passage 112. The CCU 502 then outputs a signal instructing the top hatch unit 520 to close the top hatch 110. The CCU 502 may then output a signal directing the delivery server communications relay 608 to contact one or more delivery servers to update the load state of both the UGV 300 parked in the transfer station 100 and the UAV 400.

Upon determining that a given transfer station 100 has a UGV 300 parked therein, and upon assessing the load state of the UGV 300 and any delivery requests for a UGV 300, a delivery server may output a signal instructing the UGV 300 to depart the transfer station 100. For example, if the transfer station 100 is housing a UGV 300 that is determined to have one or more containers 200 that requiring ground delivery, then the delivery server may instruct the UGV 300 to depart the transfer station 100 to complete ground delivery of the one or more containers 200. Alternatively, if the transfer station 100 is housing a UGV 300 that is determined to be in need of a reusable container 200, and if the delivery server has received a request from a sender for ground pick-up of a container 200 for delivery, then the delivery server may instruct the UGV 300 to depart the transfer station 100 for ground retrieval of the container 200.

When instructing the departure of a UGV 300 from a transfer station 100, a delivery server will also communicate with the transfer station 100 via the delivery server communications relay 608 to instruct departure of the UGV 300. Upon receiving instructions that a UGV 300 is to depart the transfer station 100, the CCU 502 will output a signal instructing the front door unit 516 to open the front door 106. The UGV 300 may depart the housing 102 under its own power; though in examples where the transfer station 100 includes an automated guiding system 118 (e.g., an automated conveyor), departure of the UGV 300 may be effected in whole or in part by the guiding system 118. In examples where the transfer station 100 includes an automated guiding system 118 (e.g., an automated conveyor), the CCU 502 will output signals to the guiding unit 518 instructing driving the UGV 300 to exit the housing 102 and instructing disengagement of the UGV 300 upon reaching an exit position of the guiding system.

Once the UGV departure unit 510 determines the UGV 300 has fully exited the housing 102, the UGV departure unit 510 will output a signal to the CCU 502 indicating the same; and the CCU 502 will then output a signal instructing the front door unit 516 to close the front door 110. The CCU 502 may then output a signal directing the delivery server communications relay 608 to contact one or more the delivery servers to update the status of the transfer station 100 to indicate the UGV 300 has exited and/or that the transfer station 100 is empty.

A transfer station such as that described herein enables a point-to-point delivery system and method whereby packages may be delivered directly to a final destination via the combined operation of one or more UAVs in traversing one or more portions of the delivery route by air, and one or more UGVs in traversing one or more other portions of the delivery route by ground. In this way, whereas a UGV may be used to deliver a package to a final destination, it is possible to complete a fully automated point-to-point delivery of a package while avoiding concerns that might prove problematic in attempting to flying a UAV to the final destination. Also, because the transfer station enables transfer of packages from a UAV to a UGV while the UAV remains in flight, there is no need for the UAV to land at any point during delivery, and it possible for the UAV to remain out of public ground space.

Transfer stations such as that described herein may be installed at various locations to establish a delivery grid around a city or geographical region to be serviced. The transfer stations may located exclusively outside populated areas of the city or region to be served; or they may be located within populated areas, though at designated locations that are deemed to present minimal to no interference with the local population (e.g., sidewalks, parking lots, building roofs, or any open areas with sufficient clearance). By establishing such delivery grids at separate cities or regions, there may then be created a large scale delivery network for long distance transportation of packages where UAVs may be used to traverse longer portions of the delivery route and UGVs may be used to complete shorter portions of the delivery route (such as the last one-thousand or so feet of a delivery route). In some instances the transfer station may be provided on the local premises or property of a business or government. This may allow businesses or governments to benefit from quick and efficient deliveries via a fully automated system. However, transfer stations such as that described herein may also be used simply at entertainment venues or events such as: amusement parks, carnivals, sport events, cruises, concerts, large weddings or private functions to facilitate the transfer of items or packages to attendees or guests.

A transfer station, or a delivery system including such transfer stations, may be used for business-to-business deliveries, business-to-consumer deliveries, and consumer-to-consumer deliveries. A delivery system according to the present invention may also be operable with a software application that can be downloaded to remote systems having a user-interface. In this way, companies may download the application for use in delivering packages from warehouses or stores directly to customers; and individuals may download the application for use in sending private, non-retail packages directly to one-another.

In operation, a reusable container may need to be provided to a transfer station after a UAV has taken a package-carrying container away from a UGV parked therein. This may be accomplished by having another UAV deliver an empty container to the UGV—and this may be performed by UAVs between delivery tasks, by UAVs that are specially tasked solely with replacing containers.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

It will be appreciated that a transfer station according to the present invention is scalable, and may be made to any suitable dimensions for accommodating UGVs and containers of many various sizes and shapes; and that a transfer station may also be made to have any number of top passages (with or without top hatches) and corresponding funnels for facilitating transfer of containers with UGVs having any number of holding spaces. It will also be appreciated that a transfer station according to the present invention may be made with both a front door and a back door, so as to enable a drive-through type delivery to a UGV—which may include sequentially delivering multiple packages to a single UGV that has multiple holding spaces along its length.

It will be appreciated that a transfer station according to the present invent may be constructed as a grounded structure, or may be supported on another foundation or structure as needed. For example, a transfer station may be supported on a raises structure (e.g., stilts) to protect it from potential flooding. A transfer station may have multiple rows of single car stations that may house UGVs for charging, cleaning and informational updates. Multiple stations may be aggregated on top of one another, side-by-side, or under landscape elements such as planter boxes or even bleachers for public seating; and may be built into the landscape in many variations.

A transfer station according to the present invention may also be constructed with a movement mechanism (e.g., a set of wheels) that may enable autonomous driving of the transfer station itself, for movement of the station between different locales. In this way, if demand in a certain area was high during certain times of the day then a nearby station that is not in use may relocate to the area of high demand to assist in the increased demand at that area.

Though the foregoing examples describe the transfer station and methods in the context of package delivery services, it will be understood that this is but one non-limiting example of the invention and its use; and that the invention may be put to use for other purposes. For example, a transfer station according to the present invention may be used to transfer: trash containers relative to UGVs that operate as trash collecting and street sweeping vehicles; snow, leaf or compost containers relative to UGV's that operate as snow, leaf or compost removal vehicles; refill containers relative to UGVs that operate to refill autonomous dispensing machines (e.g., vending machines; automatic teller machines; etc.); and animal transfer containers relative to UGV's that operate to trap and capture wildlife.

It will also be appreciated that a transfer station according to the present invention may use an actuator system that uses a mechanism other than the flaps discussed herein. For example, a transfer station according to the present invention may use an actuator system that includes an arm that extends outward, inward, downward and/or upward and which has the shape of a small funnel for connecting to lower portion of the downwardly tapering, and which has a diameter corresponding with outer dimensions of the UAV load-bearing element. The arm could be limited to a single movement direction, provided it is able to interact with the capture system of the container for guiding the load-bearing element into the capture system for pick-ups and ejecting the load-bearing element from the capture system for drop-offs.

It will also be appreciated that a transfer station according to the present invention may include one or more safety systems, including caution lights or other signaling systems that activate when the transfer station is interacting with a UAV and/or a UGV for alerting bystanders; as well as one or more cameras or other monitoring systems for observing and/or recording operation of the transfer station; and one or more shut-down systems for terminating operation of the transfer station if there is detected a failure or emergency during operation thereof.

While the disclosed methods may be performed by executing all of the disclosed steps in the precise order disclosed, without any intermediate steps therebetween, those skilled in the art will appreciate that the methods may also be performed: with further steps interposed between the disclosed steps; with the disclosed steps performed in an order other than the exact order disclosed; with one or more disclosed steps performed simultaneously; and with one or more disclosed steps omitted.

The present invention is not limited to the exemplary embodiments illustrated herein, but is instead characterized by the appended claims.

What is claimed is:

1. A transfer station for transferring containers between an unmanned aerial vehicle (UAV) and an unmanned ground vehicle (UGV), the transfer station comprising:
   a housing defining an inner space, the housing comprising a front passage that connects the inner space with an outer environment for the passage of a UGV, and a top passage that connects the inner space with an outer environment for passage of a container;
   an upward funnel within the inner space of the housing, the upward funnel comprising a chute having a lower enlarged inlet and an upper contracted outlet, the upper contracted outlet being dimensioned to communicate with the top passage of the housing for passage of a container;
   a downward funnel supported above the housing, the downward funnel comprising a chute having an upper enlarged inlet and a lower contracted outlet, the lower contracted outlet being dimensioned to communicate with the top passage of the housing for passage of a container;

an actuator system configured for, selectively, engaging a container with a UAV suspension system and disengaging a container from a UAV suspension system.

2. The transfer station according to claim 1, wherein the actuator system comprises one or more extendable and retractable slats that are configured, when in the extended position, to interact with a capture system of a container for, selectively, engaging the container with a load-bearing element of a UAV suspension system and disengaging the container from a load-bearing element of a UAV suspension system.

3. The transfer station according to claim 2, wherein the one or more slats are configured, when in the extended position, to open a capture space of a capture system of a container.

4. The transfer station according to claim 1, wherein the housing comprises a front door that opens and closes the front passage, and a top hatch that opens and closes the top passage, and the transfer station further comprises a control system configured to open the front door based on a determination that a UGV is positioned at the front passage for entering the inner space of the housing, and to open the top hatch based on a determination that a UAV is above the second passage for accessing the inner space of the housing.

5. The transfer station according to claim 4, wherein the control system is configured to open the top hatch based on a further determination that a UGV is present in the inner space of the housing at a position that is predetermined to align a holding space of the UGV with the top passage of the housing.

6. The transfer station according to claim 1, wherein the downward funnel is supported movably above the housing.

7. The transfer station according to claim 6, wherein the downward funnel is supported movably along a track that extends along a top of the housing.

8. The transfer station according to claim 7, wherein the housing is a modular housing configured to align and engage with at least one more substantially identical modular housing, and the track extending along the top of the modular housing is configured to align with and engage a track extending along a top of the at least one more substantially identical modular housing.

9. The transfer station according to claim 8, wherein the transfer station is a multi-unit transfer station comprising at least one more substantially identical modular housing aligned side-by-side with the modular housing, and the track of the modular housing is aligned and engaged with a track extending along a top of the at least one more substantially identical modular housing.

10. The transfer station according to claim 9, wherein the downward funnel is movable along the aligned and engaged tracks for selectively moving between the modular housing and the at least one more substantially identical modular housing.

11. The transfer station according to claim 9, wherein the transfer station is a multi-unit transfer station comprising two or more substantially identical modular housings aligned side-by-side in series with the modular housing, and tracks on each of the modular housings are aligned and engaged in series.

12. The transfer station according to claim 11, wherein the downward funnel is movable along the aligned and engaged tracks for selectively moving between each of the modular housings.

13. A transfer system, comprising:

a transfer station according to claim 1;

a UGV having a holding space for carrying a container;

a UAV having a suspension system for carrying a container; and a container that is transferable between the UGV and the UAV, the container being dimensioned for reception within the holding space of the UGV, and the container comprising a capture system for engaging the suspension system of the UAV, wherein the actuator system of the transfer station is configured to interact with the capture system of the container for, selectively, engaging the capture system with the suspension system of the UAV and disengaging the capture system from the suspension system of the UAV.

14. The transfer system according to claim 13, wherein the capture system comprises a shell defining a capture space, one or more panels that open and close the capture space, and one or more biasing elements for biasing the panels to a closed position, and the actuator system comprises one or more extendable and retractable slats that are configured, when in the extended position, to contact and move the one or more panels of the capture system of the container to an open position.

15. The transfer system according to claim 14, wherein the suspension system of the UAV comprises an extendable and retractable cable, and a load-bearing element at an end of the cable, the load-bearing element being dimensioned for reception within the capture space of the capture system.

16. The transfer system according to claim 15, wherein the transfer station further comprises a control system configured to communicate with the UGV and the UAV, and to control the actuator system.

17. A method of transferring a container from a UAV to a UGV using the transfer system according to claim 15, comprising:

positioning the UGV in the inner space of the housing of the transfer station, at a position that is predetermined to align the holding space of the UGV with the top passage of the housing;

positioning the UAV vertically above the transfer station, at a position that aligns the suspension system of the UAV with the top passage of the housing, with the container supported on the suspension system;

lowering the suspension system of the UAV to pass the container through the top passage of the housing and into the holding space of the UGV;

extending the slats of the actuator system to move the panels of the capture system of the container to the open position;

raising the suspension system of the UAV to remove the load-bearing element from the capture space of the capture system and out the top passage of the housing; and retracting the slats of the actuator system to permit the panels of the capture system to return to a closed position.

18. A method of transferring a container from a UGV to a UAV using the transfer system according to claim 15, comprising:

positioning the UGV in the inner space of the housing of the transfer station, at a position that is predetermined to align the holding space of the UGV with the top passage of the housing, with the container held in the holding space of the UGV;

positioning the UAV vertically above the transfer station, at a position that aligns the suspension system of the UAV with the top passage of the housing;

extending the slats of the actuator system to move the panels of the capture system of the container to the open position;

lowering the suspension system of the UAV to pass the load-bearing element through the top passage of the housing and into the capture space of the capture system of the container;

retracting the slats of the actuator system to permit the panels of the capture system to return to a closed position, entrapping the load-bearing element within the capture space; and raising the suspension system of the UAV to lift the container from the holding space of the UGV and out the top passage of the housing.

\* \* \* \* \*